US012027106B2

(12) United States Patent
Tsai et al.

(10) Patent No.: US 12,027,106 B2
(45) Date of Patent: Jul. 2, 2024

(54) DISPLAY AND DEHUMIDIFICATION METHOD THEREOF

(71) Applicant: ViewSonic International Corporation, New Taipei (TW)

(72) Inventors: Jia-Shin Tsai, New Taipei (TW); Li wei Cheng, New Taipei (TW); Shun-Chang Chen, New Taipei (TW)

(73) Assignee: ViewSonic International Corporation, New Taipei (TW)

( * ) Notice: Subject to any disclaimer, the term of this patent is extended or adjusted under 35 U.S.C. 154(b) by 0 days.

(21) Appl. No.: 18/192,659

(22) Filed: Mar. 30, 2023

(65) Prior Publication Data

US 2023/0316992 A1 Oct. 5, 2023

(30) Foreign Application Priority Data

Apr. 1, 2022 (TW) .................................. 111112797

(51) Int. Cl.
*G09G 3/32* (2016.01)

(52) U.S. Cl.
CPC ......... *G09G 3/32* (2013.01); *G09G 2320/043* (2013.01); *G09G 2320/0626* (2013.01); *G09G 2330/026* (2013.01); *G09G 2330/027* (2013.01); *G09G 2354/00* (2013.01)

(58) Field of Classification Search
CPC ............... G09G 3/32; G09G 2320/043; G09G 2320/0626; G09G 2330/026; G09G 2330/027; G09G 2354/00
See application file for complete search history.

(56) References Cited

U.S. PATENT DOCUMENTS

2016/0034284 A1* 2/2016 Won .................... G06F 9/44505 713/100

FOREIGN PATENT DOCUMENTS

| | | | | |
|---|---|---|---|---|
| CN | 111240383 | | 6/2020 | |
| CN | 111613189 | | 9/2020 | |
| CN | 111613189 | A * | 9/2020 | |
| CN | 212623781 | | 2/2021 | |
| CN | 112558651 | | 3/2021 | |
| KR | 100200528 | B1 * | 7/1996 | ............... G06F 1/28 |
| WO | WO-2020034906 | A1 * | 2/2020 | ............... G09G 3/32 |

* cited by examiner

*Primary Examiner* — Benjamin C Lee
*Assistant Examiner* — Nathan P Brittingham
(74) *Attorney, Agent, or Firm* — JCIPRNET

(57) ABSTRACT

A display and a dehumidification method thereof are disclosed. The method includes the following. An interval time from a previous dehumidification process is calculated, and the interval time is compared with a threshold time. When the interval time exceeds the threshold time, a first reminder window is displayed for a user to choose whether to perform a dehumidification process when the dehumidification process or booting is executed automatically in a shutdown state. It is determined whether to limit a brightness of a display panel of the display according to a selecting operation with regard to the dehumidification process.

17 Claims, 4 Drawing Sheets

DISPLAY AND DEHUMIDIFICATION METHOD THEREOF

CROSS-REFERENCE TO RELATED APPLICATION

This application claims the priority benefit of Taiwan application serial no. 111112797, filed on Apr. 1, 2022. The entirety of the above-mentioned patent application is hereby incorporated by reference herein and made a part of this specification.

BACKGROUND

Technical Field

The invention relates to a maintenance method of a display, and more particularly, to a display and a dehumidification method thereof.

Description of Related Art

Along with development of optoelectronic technology, conventional incandescent bulbs and fluorescent tubes have been gradually replaced by a new generation of solid-state light sources such as light-emitting diodes (LEDs), which have advantages of long service life, small size, high shock resistance, high light efficiency, low power consumption, etc., and have been widely used as light sources in household lighting and various equipment, and have become one of the main projects for development of light sources with both power saving and environmental protection functions.

A direct view LED display is a display commonly used in large advertising billboards, and has an advantage of being able to present a rich visual experience to viewers. However, a general direct view LED display cannot block 100% moisture during packaging, and has a problem of being affected by moisture. If the display is not used for a long time or the frequency of use is not high, moisture will easily penetrate into the interior, thereby affecting vividness of a displayed image and shortening the service life of the display.

A current method is mainly to find a way to remove the internal moisture of the LED display when a manufacturer performs regular maintenance, or when the displayed image is obviously abnormal. Such a passive processing method may cause processing procrastination and exacerbate the impact.

SUMMARY

The invention relates to a display and a dehumidification method thereof, which may actively remind, automatically execute, or warn a user to perform a dehumidification process to prolong a service life of the display.

A dehumidification method in the invention is applicable to a display, which includes the following. An interval time from a previous dehumidification process is calculated, and the interval time is compared with a threshold time. When the interval time exceeds the threshold time, a first reminder window is displayed for a user to choose whether to perform a dehumidification process. It is determined whether to limit a brightness of a display panel of the display according to a selecting operation with regard to the dehumidification process.

A display in the invention includes a display panel, a brightness control circuit, a display device, a storage device, and a processor. The brightness control circuit is coupled to the display panel to control a brightness of the display panel. The storage device is configured to store a computer program. The processor is coupled to the brightness control circuit, the display device, and the storage device, and loads and executes the computer program to calculate an interval time from a previous dehumidification process and compare the interval time with a threshold time; when the interval time exceeds the threshold time, display a first reminder window through the display device for a user to choose whether to perform a dehumidification process; and determine whether to limit a brightness of the display panel through the brightness control circuit according to a selecting operation with regard to the dehumidification process.

Based on the above, the display and the dehumidification method of the invention may actively remind or warn the user to perform the dehumidification process in time when the interval time from the previous dehumidification process is too long. If it is inconvenient for the user to perform the dehumidification process immediately, the brightness of the display panel may also be actively reduced, thereby prolonging the service life of the display.

In order for the aforementioned features and advantages of the disclosure to be more comprehensible, several embodiments accompanied with drawings are described in detail as follows.

DESCRIPTION OF THE EMBODIMENTS

Figure 1:
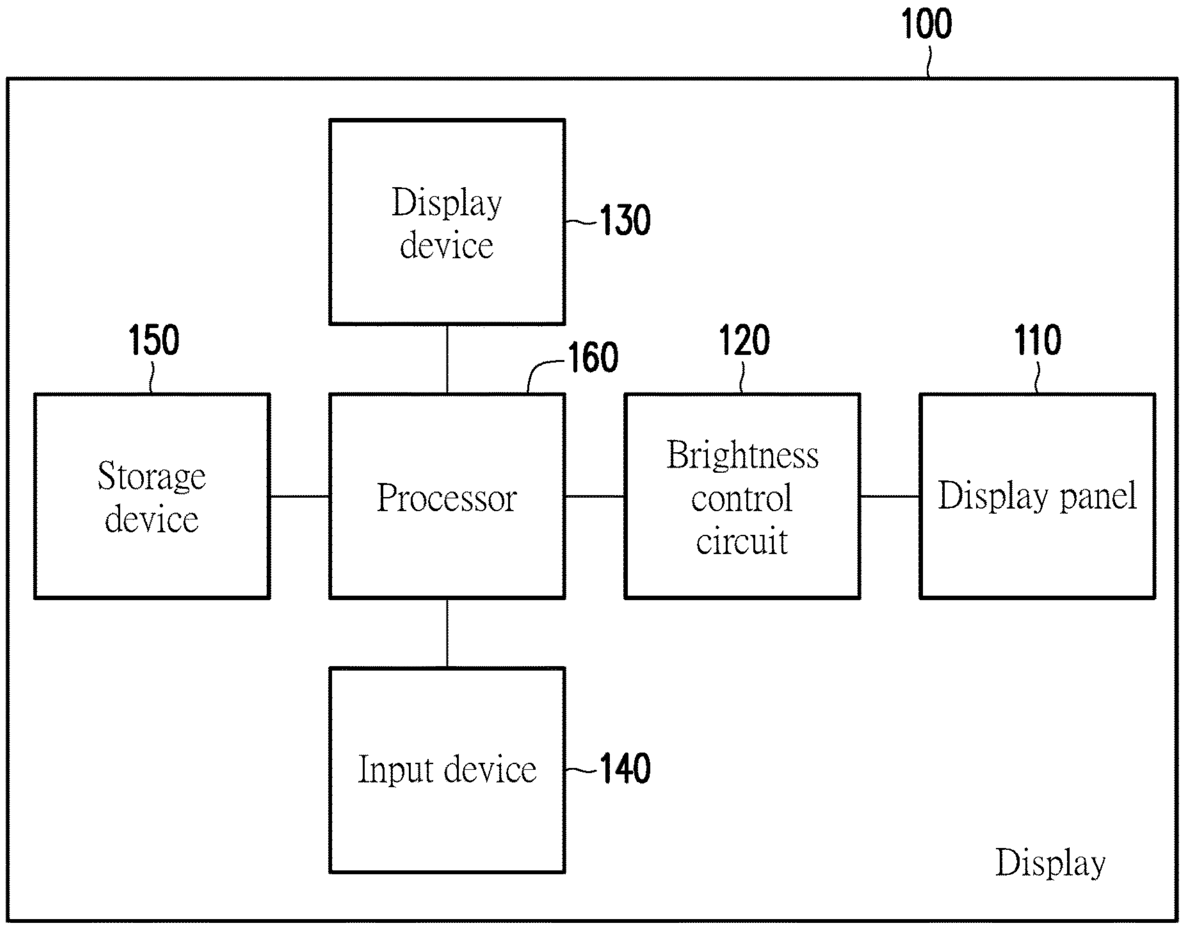
FIG. 1 is a block diagram of a display according to an embodiment of the invention.

FIG. 1 is a block diagram of a display according to an embodiment of the invention. Referring to FIG. 1, a display 100 of the embodiment is, for example, a direct view LED display commonly used in large billboards. As shown in FIG. 1, the display 100 includes components such as a display panel 110, a brightness control circuit 120, a display device 130, an input device 140, a storage device 150, and a processor 160, and functions of these components are described below.

The display panel 110 is, for example, an LED display panel, which may be used to display images. The brightness control circuit 120 is, for example, a hardware component, a circuit or a microcontroller capable of generating a pulse-width modulation (PWM) signal. The brightness control circuit 120 is coupled to the display panel 110 and may be used to control a brightness of the display panel 110.

The display device 130 is, for example, a display using a liquid crystal display (LCD) panel, a light-emitting diode (LED) panel, a field emission display (FED) panel or other types of panels. The display device 130 may be used to display messages or windows to deliver messages to users. A difference between the display device 130 and the display panel 110 is that the display device 130 is mainly provided to a manager of the display 100 to operate the display 100. For example, the display device 130 may be installed on a casing of the display 100, or connected externally in a wired or wireless manner and installed on other operating devices, which is not limited by the invention.

The input device 140 is, for example, a mouse, an input button, a remote controller, a touchpad or a touch panel with resistive, capacitive or other types of touch sensing elements, which may receive an input operation from the user. The input device 140 may, for example, also be combined with the display panel 110 to form a touch panel, which may receive a user's touch operation on an image displayed on the display panel 110.

The storage device 150 is, for example, any type of fixed or removable random access memory (RAM), read-only memory (ROM), flash memory, hard disk or similar components, or a combination of the above components, which may be used to store computer programs that may be executed by the processor 160 and data used by the same.

The processor 160 is, for example, a central processing unit (CPU), or other programmable general purpose or special purpose microprocessor, digital signal processor (DSP), programmable controller, application specific integrated circuit (ASIC) or other similar components or a combination of the above components.

As shown in FIG. 1, the processor 160 is coupled to the brightness control circuit 120, the display device 130, the input device 140 and the storage device 150. In the embodiment, the processor 160 may load a computer program from the storage device 150 to perform a dehumidification method for removing moisture inside the display 100. The following examples illustrate detailed steps of the dehumidification method of the invention.

Figure 2:
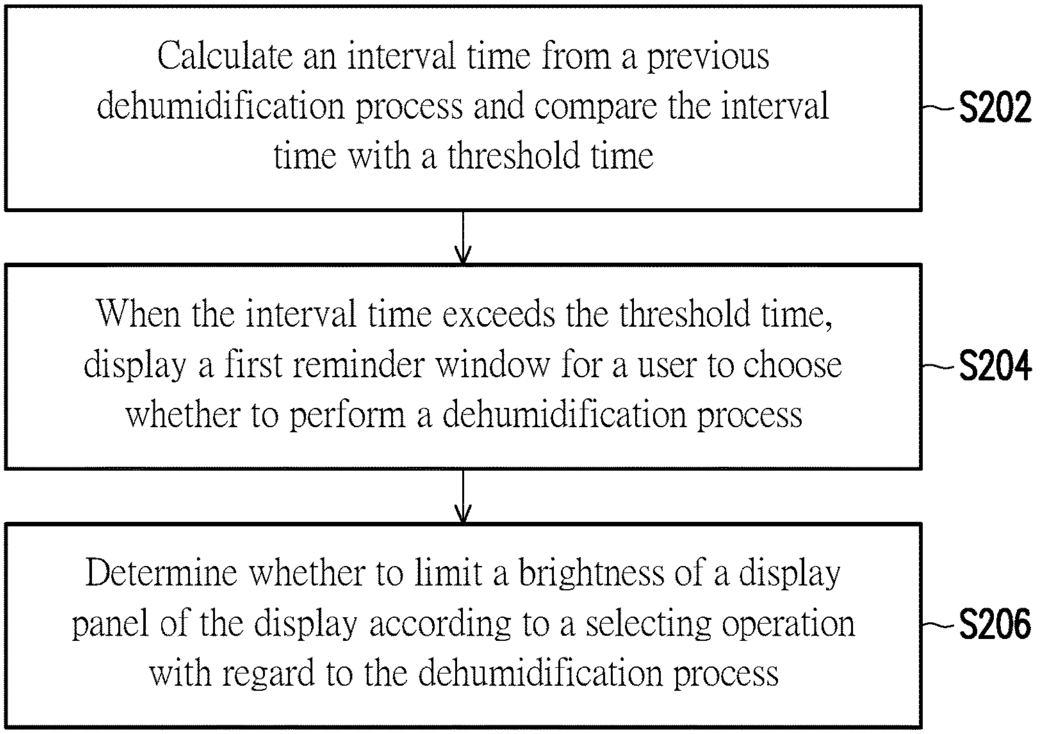
FIG. 2 is a flowchart of a dehumidification method according to an embodiment of the invention.

FIG. 2 is a flowchart of a dehumidification method according to an embodiment of the invention. Referring to FIG. 1 and FIG. 2 at the same time, the dehumidification method of the embodiment is applicable to the display 100 in FIG. 1. Steps of the dehumidification method of the embodiment of the invention are described below with reference of various components in the display 100.

In step S202, the processor 160 calculates an interval time from a previous dehumidification process, and compare it with a threshold time. To be specific, the processor 160 may read a dehumidification record from the storage device 150 to obtain an execution time of the previous dehumidification process, and calculate the interval time from the previous dehumidification process according to a current time and the obtained execution time, so as to compare calculated interval time with the preset threshold time. The dehumidification record in the embodiment may include related information such as a time and date when the dehumidification process was performed in the past, a time and date when the user was actively reminded to perform the dehumidification process, and a time and date when the user refused to perform the dehumidification process. In addition, the threshold time in the embodiment may be, for example, preset and adjusted according to characteristics of LEDs in the display 100.

Figure 3:
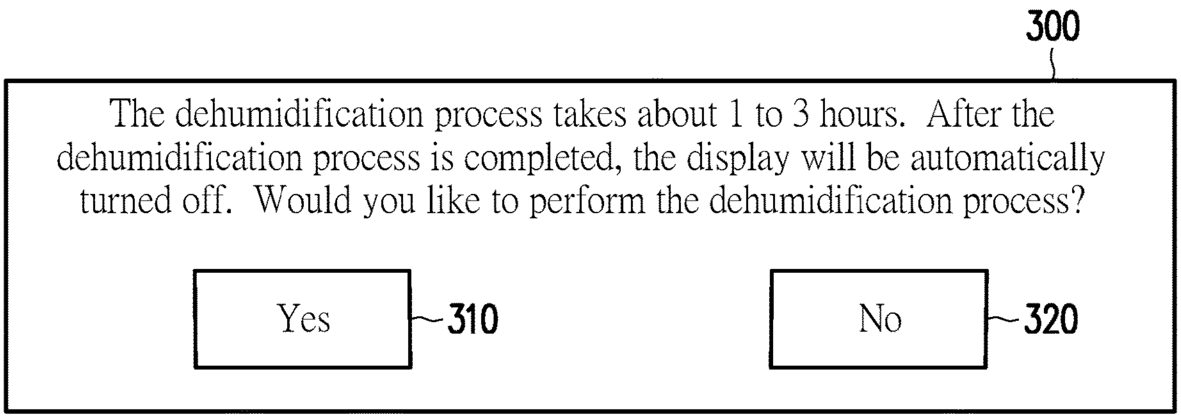
FIG. 3 is an example of the dehumidification method according to an embodiment of the invention.

Then, in step S204, when the interval time exceeds the threshold time, the processor 160 may display a first reminder window through the display device 130 for the user to choose whether to perform the dehumidification process. For example, FIG. 3 is an example of the dehumidification method according to an embodiment of the invention. Referring to FIG. 3, a first reminder window 300 shows a text of "the dehumidification process takes about 1 to 3 hours, and after the dehumidification process is completed, the display will be automatically turned off, do you want to perform the dehumidification process?", which actively remind or warn the user to perform the dehumidification process. As shown in FIG. 3, icons 310 and 320 respectively representing "yes" and "no" are also displayed in the first reminder window 300 for the user to choose. The user may, for example, use the input device 140 to select the icon 310 or the icon 320.

It should be noted that the dehumidification process in the embodiment includes gradually brightening the display panel 110 from a low to high brightness through the brightness control circuit 120 according to the characteristics of the LEDs in the display 100. For example, the processor 160 may use the brightness control circuit 120 to make the display panel 110 to sequentially display 30% brightness for a predetermined time, 50% brightness for the predetermined time, and 70% brightness for the predetermined time, so as to gradually brighten the display panel 110 from a low to high brightness to achieve the effect of removing moisture. The predetermined time is, for example, about 1 hour, which may be preset and adjusted according to the characteristics of the LEDs in the display 100. In another embodiment, the processor 160 may also perform the dehumidification process by gradually brightening the display panel 110 from a high to low brightness, which is not limited by the invention.

Referring back to FIG. 2, finally, in step S206, the processor 160 may determine whether to limit the brightness of the display panel 110 through the brightness control circuit 120 according to ae selecting operation with regard to the dehumidification process. To be specific, the processor 160 may receive the selecting operation from the user through the input device 140. When the selecting operation selects to perform the dehumidification process, the processor 160 does not limit the brightness of the display panel 110 and performs the dehumidification process.

On the other hand, when the selecting operation selects not to perform the dehumidification process, the processor 160 limits the brightness of the display panel 110 and display a prompt message through the display device 130. To be specific, the processor 160 may limit the brightness of the display panel 110 to only 50%-60% through the brightness control circuit 120, so as to reduce a temperature of the display panel 110, reduce the generation of moisture, and reduce the influence of electrical characteristics by the moisture. Meanwhile, the processor 160 may display a prompt message through the display device 130 to inform the user that the brightness of the display panel 110 is reduced.

Based on the above method, when the interval from the previous dehumidification process is too long, the display 100 may actively remind or warn the user to perform the dehumidification process in time to avoid procrastination. Moreover, when the user is inconvenient to perform the dehumidification process immediately, the brightness of the display panel 110 may be actively reduced to prolong the service life of the display 100.

Figure 4:
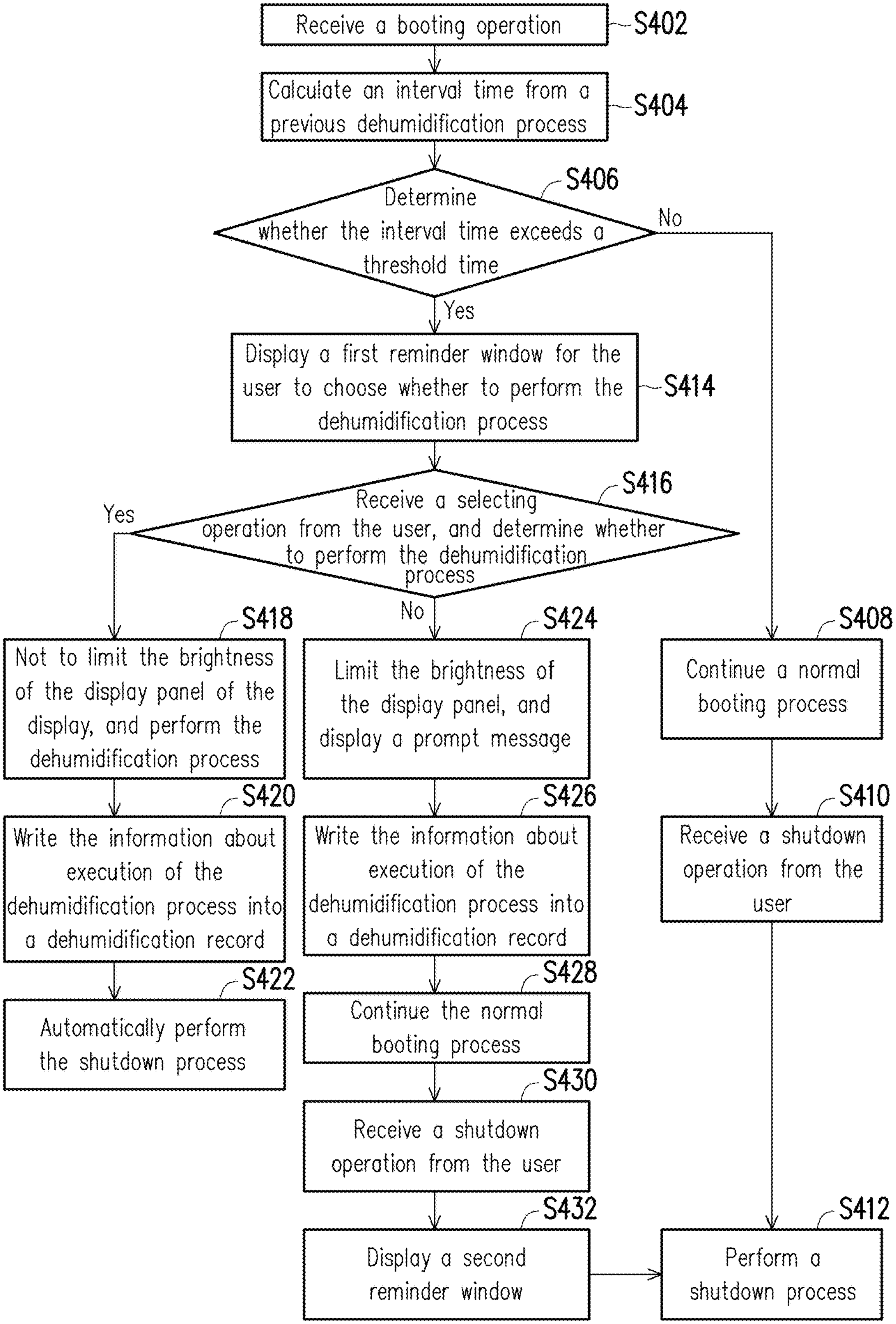
FIG. 4 is a flowchart of a dehumidification method according to an embodiment of the invention.

In another embodiment of the invention, the dehumidification method of the invention may be integrated into a booting process of the display 100 for execution. In detail, FIG. 4 is a flowchart of a dehumidification method according to an embodiment of the invention. Referring to FIG. 1 and FIG. 4 at the same time, the dehumidification method of the embodiment is applicable to the display 100 of FIG. 1. Steps of the dehumidification method of the embodiment of the invention are described below with reference of various components in the display 100.

In step S402, the processor 160 may receive a booting operation from the user through the input device 140, so as to perform the booting process of the display 100. Then, in step S404, during the execution of the booting process, the processor 160 may calculate an interval time from a previous dehumidification process. To be specific, the processor 160 may read a dehumidification record from the storage device 150 to obtain an execution time of the previous dehumidification process, and calculate the interval time from the previous dehumidification process according to a current time and the obtained execution time.

In step S406, the processor 160 may determine whether the interval time exceeds a threshold time. If the interval time does not exceed the threshold time, in step S408, the processor 160 may continue the normal booting process.

After the booting process ends and the display 100 is used normally, in step S410, the processor 160 receives a shutdown operation from the user through the input device 140. Therefore, in step S412, the processor 160 may perform a shutdown process to turn off the display 100.

Returning to step S406, if the interval time exceeds the threshold time, in step S414, the processor 160 may display the first reminder window through the display device 130 for the user to choose whether to perform the dehumidification process.

Then, in step S416, the processor 160 may receive a selecting operation from the user through the input device 140, and determine whether to perform the dehumidification process.

If it is selected to perform the dehumidification process, in step S418, the processor 160 does not limit the brightness of the display panel 110 of the display 100, and performs the dehumidification process. After the dehumidification process is finished, in step S420, the processor 160 writes the information about the execution of the dehumidification process into the dehumidification record stored in the storage device 150 as a reference for a next operation. Then, in step S422, the processor 160 may automatically perform the shutdown process. Accordingly, after deciding to perform the dehumidification process, the user may leave the display 100 at will to avoid wasting time.

Returning to step S416, if the user selects not to perform the dehumidification process, in step S424, the processor 160 limits the brightness of the display panel 110 through the brightness control circuit 120, for example, the display panel 110 is limited to only have 50%-60% brightness, and display a prompt message to inform the user that the brightness of the display panel 110 is reduced.

Then, in step S426, the processor 160 writes information about the execution of the dehumidification process into the dehumidification record stored in the storage device 150 as a reference for the next operation.

Then, in step S428, the processor 160 may continue the normal booting process. After the booting process ends and the display 100 is used normally, in step S430, the processor 160 receives a shutdown operation from the user through the input device 140.

Figure 5:
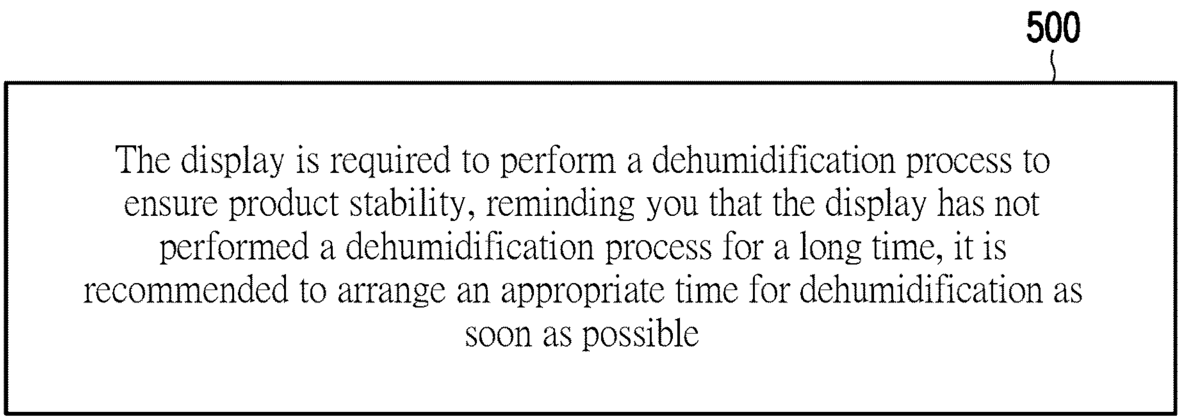
FIG. 5 is an example of the dehumidification method according to an embodiment of the invention.

Before executing the shutdown process, in step S432, the processor 160 may display a second reminder window through the display device 130. For example, FIG. 5 is an example of the dehumidification method according to an embodiment of the invention. Referring to FIG. 5, a second reminder window 500 displays a text of "the display needs to perform a dehumidification process to ensure product stability, reminding you that the display has not performed a dehumidification process for a long time, it is recommended to arrange an appropriate time for dehumidification as soon as possible" to remind users to remember scheduling an appropriate time for dehumidification. In order to avoid hindering the execution of the shutdown process, the second reminder window 500 may be, for example, automatically closed after being continuously displayed for 5 seconds, but the invention is not limited thereto.

Finally, in step S412, the processor 160 may perform the shutdown process to turn off the display 100.

In another embodiment of the invention, the dehumidification method of the invention also allows the user to set a time and a period to perform the dehumidification process of the display 100. For example, the user may set the display 100 to automatically turn on during an off-peak time to perform the dehumidification process. After the dehumidification process is completed, the information about the execution of the dehumidification process will also be written into the dehumidification record stored in the storage device 150, and the display 100 automatically performs the shutdown process.

Figure 6:
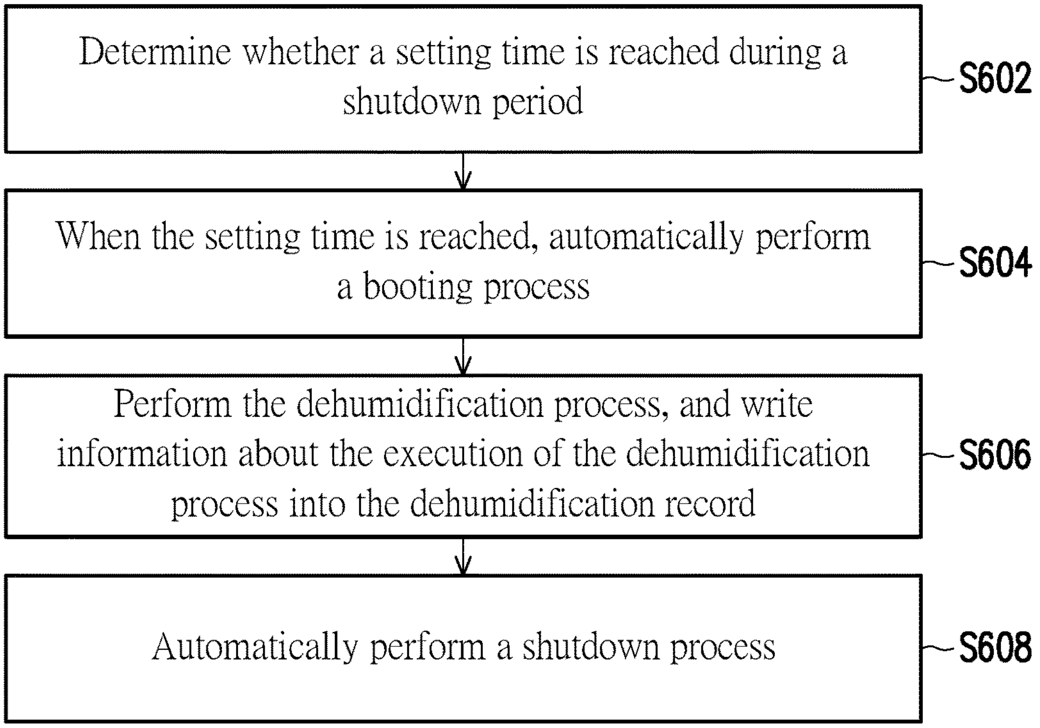
FIG. 6 is a flowchart of a dehumidification method according to an embodiment of the invention.

In detail, FIG. 6 is a flowchart of a dehumidification method according to an embodiment of the invention. Referring to FIG. 1 and FIG. 6 at the same time, the dehumidification method of the embodiment is applicable to the display 100 of FIG. 1.

Steps of the dehumidification method of the embodiment of the invention are described below with reference of various components in the display 100.

In step S602, the processor 160 may determine whether a setting time is reached during a shutdown period (or a sleep period) of the display 100. When the setting time is reached, in step S604, the processor 160 may automatically perform a booting process. The setting time in the embodiment is, for example, an off-peak time preset according to a usage status of the display 100.

Then, in step S606, the processor 160 may perform the dehumidification process, and write information about the execution of the dehumidification process into the dehumidification record stored in the storage device 150. Finally, in step S608, the processor 160 may automatically perform a shutdown process.

By the above method, the display 100 may automatically perform the dehumidification process at the preset time, which avoids procrastination, and prolonging the service life of the display 100.

In summary, the display and the dehumidification method of the invention may actively remind or warn the user to perform the dehumidification process in time when the interval time from the previous dehumidification process is too long. If it is inconvenient for the user to perform the dehumidification process immediately, the brightness of the display panel may also be actively reduced, thereby reducing generation of moisture, so as to reduce the influence of the electrical characteristics by the moisture. In addition, the invention may also automatically perform the dehumidification process at a preset time to avoid procrastination and prolong the service life of the display.

What is claimed is:

1. A dehumidification method, applicable to a display, wherein the dehumidification method comprises:

calculating an interval time from a previous dehumidification process and comparing the interval time with a threshold time;

when the interval time exceeds the threshold time, displaying a first reminder window on the display for a user to select whether to perform a dehumidification process; and determining whether to limit a brightness of a display panel of the display according to the user selecting operation with regard to the dehumidification process, wherein determining whether to limit the brightness of the display panel of the display according to the selecting operation with regard to the dehumidification process comprises:

when the selecting operation selects not to perform the dehumidification process, automatically reducing the brightness of the display panel to a predetermined brightness percentage, and displaying a prompt message.

2. The dehumidification method according to claim 1, wherein calculating the interval time from the previous dehumidification process comprises:

reading a dehumidification record to obtain an execution time of the previous dehumidification process; and calculating the interval time according to a current time and the execution time.

3. The dehumidification method according to claim 1, wherein determining whether to limit the brightness of the display panel of the display according to the selecting operation with regard to the dehumidification process comprises:

receiving the selecting operation from the user; and when the selecting operation selects to perform the dehumidification process, not to limit the brightness of the display panel, and performing the dehumidification process.

4. The dehumidification method according to claim 3, wherein after performing the dehumidification process, the dehumidification method further comprises:

automatically performing a shutdown process.

5. The dehumidification method according to claim 1, wherein after determining whether to limit the brightness of the display panel of the display according to the selecting operation with regard to the dehumidification process, the dehumidification method further comprises:

writing information about execution of the dehumidification process into a dehumidification record.

6. The dehumidification method according to claim 1, wherein the dehumidification method is integrated in a booting process of the display for execution.

7. The dehumidification method according to claim 6, further comprising:

receiving a shutdown operation from the user; and in a case that the selecting operation selects not to perform the dehumidification process, displaying a second reminder window before performing a shutdown process.

8. The dehumidification method according to claim 1, further comprising:

determining whether a setting time is reached during a shutdown period;

when the setting time is reached, automatically performing a booting process;

performing the dehumidification process and writing information about execution of the dehumidification process into a dehumidification record; and automatically performing a shutdown process.

9. The dehumidification method according to claim 1, wherein the dehumidification process comprises gradually brightening the display panel from a low to high brightness according to characteristics of light-emitting diodes in the display.

10. A display, comprising:

a display panel configured to display an image;

a brightness control circuit coupled to the display panel and configured to control a brightness of the display panel;

a display device;

a storage device configured to store a computer program; and a processor coupled to the brightness control circuit, the display device, and the storage device, and loading and executing the computer program to:

calculate an interval time from a previous dehumidification process and compare the interval time with a threshold time;

when the interval time exceeds the threshold time, display a first reminder window on the display through the display device for a user to select whether to perform a dehumidification process; and determine whether to limit a brightness of the display panel through the brightness control circuit according to the user selecting operation with regard to the dehumidification process, wherein when the selecting operation selects not to perform the dehumidification process, the processor automatically reduces the brightness of the display panel to a predetermined brightness percentage through the brightness control circuit, and displays a prompt message through the display device.

11. The display according to claim 10, wherein the processor reads a dehumidification record from the storage device to obtain an execution time of the previous dehumidification process, and calculates the interval time according to a current time and the execution time.

12. The display according to claim 10, further comprising an input device, wherein the processor receives the selecting operation from the user through the input device, and when the selecting operation selects to perform the dehumidification process, the processor does not limit the brightness of the display panel, and performs the dehumidification process.

13. The display according to claim 12, wherein after performing the dehumidification process, the processor automatically performs a shutdown process.

14. The display according to claim 10, wherein the processor writes information about execution of the dehumidification process into a dehumidification record stored in the storage device.

15. The display according to claim 10, further comprising an input device, wherein the processor receives a shutdown operation from the user through the input device, and in a case that the selecting operation selects not to perform the dehumidification process, the processor displays a second reminder window through the display device before performing a shutdown process.

16. The display according to claim 10, wherein the processor determines whether a setting time is reached during a shutdown period, and when the setting time is reached, the processor automatically performs a booting process, the processor performs the dehumidification process and writes information about execution of the dehumidification process into a dehumidification record stored in the storage device, and automatically performs a shutdown process.

17. The display according to claim 10, wherein the dehumidification process comprises gradually brightening the display panel from a low to high brightness through the brightness control circuit according to characteristics of light-emitting diodes in the display.

* * * * *